May 11, 1954
F. A. SMITH
2,678,180
DITCHING SEAT FOR AIRCRAFT OCCUPANTS
Filed May 25, 1950
2 Sheets-Sheet 1
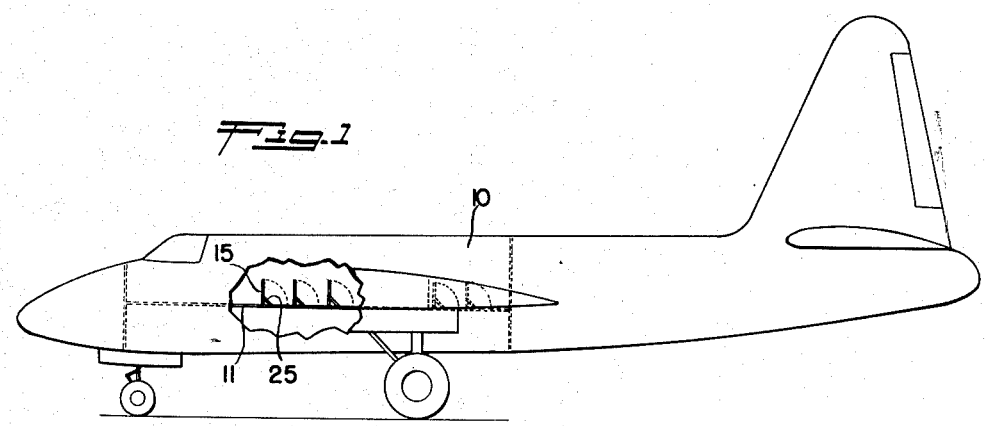
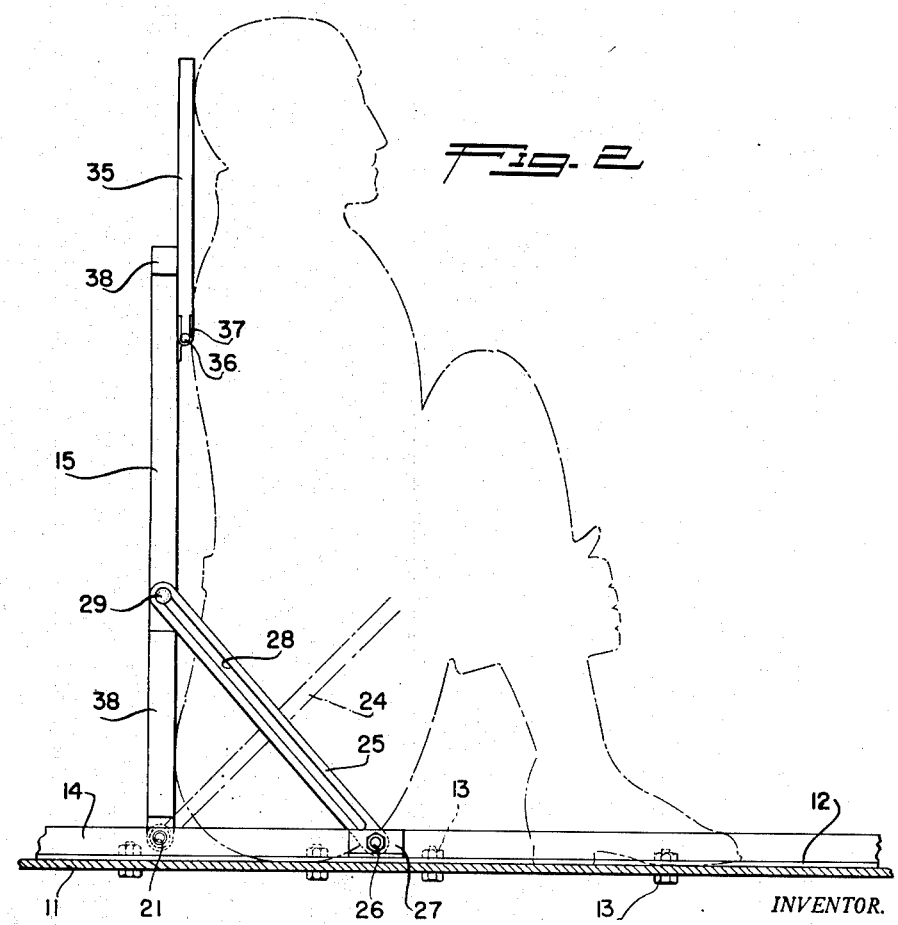
INVENTOR.
FRANCIS A. SMITH
BY
Agent May 11, 1954
F. A. SMITH
2,678,180
DITCHING SEAT FOR AIRCRAFT OCCUPANTS
Filed May 25, 1950
2 Sheets-Sheet 2
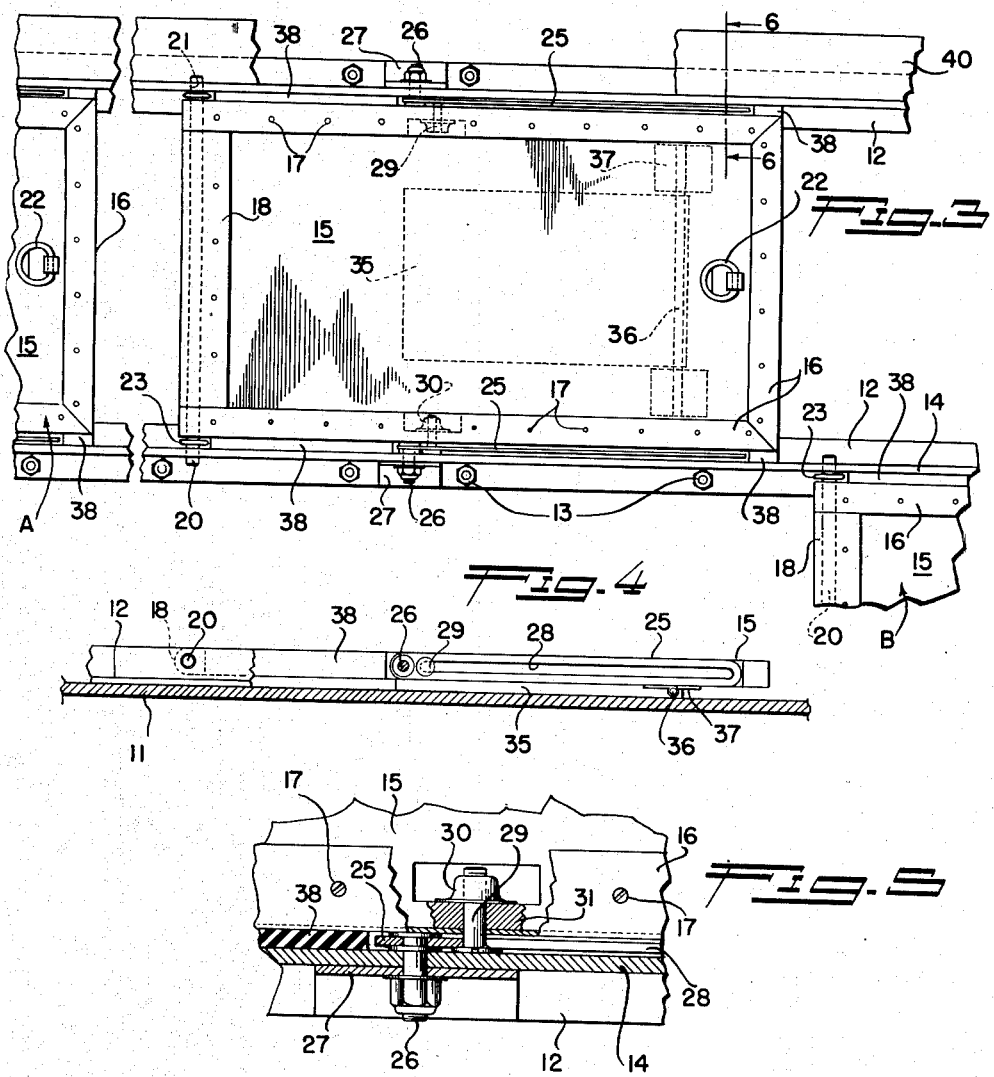
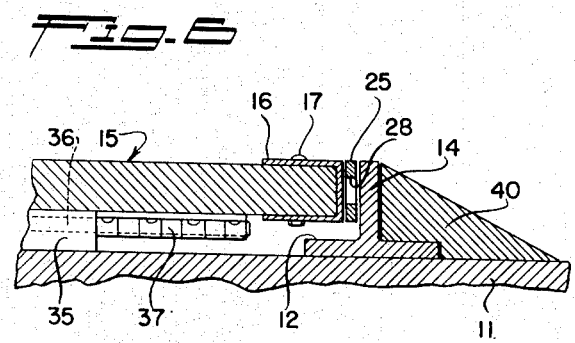
INVENTOR.
FRANCIS A. SMITH
BY
*George C. Sullivan*
Agent Patented May 11, 1954

2,678,180

UNITED STATES PATENT OFFICE 2,678,180

DITCHING SEAT FOR AIRCRAFT OCCUPANTS

Francis A. Smith, Glendale, Calif., assignor to Lockheed Aircraft Corporation, Burbank, Calif.

Application May 25, 1950, Serial No. 164,050

2 Claims. (Cl. 244—118)

This invention relates to means for protecting the occupants and crew members of aircraft from the effects of emergency landings and crashes on the ocean and other bodies of water, and it is a general object of the invention to provide reliable, inexpensive, and light-weight devices of this character.

It has been found necessary to provide what are known as "ditching positions" or seats for the crews and other occupants of over-water aircraft and, particularly, of land-based over-water aircraft, to reduce the possibility of injury to the occupants when the airplane is "ditched," that is brought down to an emergency landing at sea. Such ditching positions or seats must be strong to withstand the sudden and heavy loads imposed by the inertia of the occupants' bodies at the time of ditching the airplane and yet must be compact and light in weight.

Another object of the invention is to provide a ditching station or seat that normally occupies a minimum of space in the aircraft, does not form an obstruction or hazard to free movement of the crew and equipment and yet may be easily and quickly extended to form a reliable and adequate seat to protect the crew members against the effects of the sudden deceleration accompanying the ditching of the airplane.

Another object of the invention is to provide a ditching seat of the character mentioned that may either be recessed in the floor or merely secured on the floor of the aircraft where it lies flat and substantially flush and that may be quickly raised or extended to provide a head rest, back rest and safety belt attachment for the occupant or crew member. The seat device is such that the substantial loads resulting from ditching of the airplane may be transferred to and distributed on the sub-structure of the floor, thereby avoiding the necessity of making special structural provisions or alterations in the airplane structure to assume such loads. Furthermore, the ditching station or seat, being substantially flush with the floor surface when not in use does not hamper movements of the crew or affect free access to equipment in the adjacent areas.

Another object of the invention is to provide a ditching seat of this character that is capable of easy, rapid installation at the field with a minimum of structural modification or rework of the airplane and that may be removed when not operationally required. The seats of the invention may be made up in field kits of the type that may be readily installed when over-water operations are contemplated and that may be removed from the airplane when such over-water operations are not to be carried out.

A further object of the invention is to provide ditching seats of this class that may be used as single units, in pairs, or in multiple installations where the seats are in side-by-side relation, or one behind the other.

Other objectives and features of the invention will become apparent from the following detailed description of a typical preferred embodiment throughout which reference is made to the accompanying drawings wherein:

Figure 1 is a side view of a typical airplane incorporating ditching seats of the invention with a portion broken away to illustrate the raised or extended seats in elevation;

Figure 2 is an enlarged side elevation of an extended seat of the invention with the occupant appearing in broken lines and with the floor of the airplane in vertical cross section;

Figure 3 is a plan view of a lowered seat of the invention and showing portions or fragments of adjacent seats;

Figure 4 is a fragmentary edge view of the lowered seat with the aircraft floor appearing in vertical cross section;

Figure 5 is an enlarged fragmentary horizontal detailed sectional view illustrating the attachments of one of the tension straps of the seats; and Figure 6 is a fragmentary vertical sectional view illustrating one of the supporting rail ramps.

The ditching stations or seats of the invention are, of course, adapted for use in aircraft of various types, etc. and may be arranged therein as the conditions dictate. In Figure 1, I have shown an airplane having a fuselage 10 containing the cabin or crew quarters and provided with a conventional floor 11. I will describe the ditching seats of my invention as installed on this floor 11, it being understood that this is only one typical application of the invention.

Each seat includes a pair of spaced parallel supporting rails 12. The rails 12 are adapted to be secured to the floor 11 and may either be arranged on the active upper surface of the floor or directly secured to the sub-structure of the floor. In the case illustrated it will be assumed that the rails 12 are laid on the active surface of the floor 11 and are secured thereto and to the sub-structure of the floor by bolts 13, or the like. The rails 12 have rather broad base flanges and upstanding flanges 14 intermediate the margins of their bases. As illustrated, the rails 12 extend fore and aft of the airplane and the length of the rails is determined by the number of seats that are to be arranged in a fore and aft row in that given series. Where only a single seat is to be installed the rails 12 may be rather short but, as illustrated in Figure 3, the rails may be of sufficient length to carry two or more seats in a fore and aft row.

Each seat further includes a back rest 15 in the form of a rectangular panel. While the back rest 15 may be constructed of any appropriate material, it may be preferred to make it of plywood, in which case it is bound or reinforced along its two longitudinal edges and its aft edge by channel members 16 of an aluminum alloy, or the like, secured to the panel or back rest by screws 17, or the like. The forward edge of the back rest 15 is provided with a metal edge or channel member 18 having a curved or rounded edge. The back rest 15 is proportioned to be received between the vertical flanges 14 of the two spaced rails 12 to leave a clearance or space at each longitudinal edge of the back rest when the same is in its idle or lowered position. The back rest 15 is sufficiently strong and sturdy to be walked upon when in the lowered position. In accordance with the invention the forward end of the back rest 15 is pivoted or hinged on the rails 12 to be movable between the lowered position shown in Figure 3, and the raised or active position illustrated in Figure 2. The simple hinge means illustrated comprises a substantially horizontal hinge tube 20 carried in an opening in the forward edge portion of the back rest 15 and having its opposite end portions received in openings 21 in the flanges 14 of the supporting rails 12. The tube 20 is free to turn in the openings 21 so that the back rest 15 may be readily raised and lowered. A hinged ring 22 may be recessed in the upper side of the back rest 15 adjacent its rear edge to form a handle for facilitating raising and lowering of the back rest. Safety belt attachments in the form of rings 23 are arranged on the hinge tube 20 between the edges of the back rest and the adjacent rail flanges 14. The broken lines 24 of Figure 2 illustrate the approximate position of a safety belt arranged with its ends anchored at the rings 23.

Means is provided to support the back rest 15 in the raised position of Figure 2 where it provides a dependable load assuming rest or support for the back of the crew member or occupant. A tension strap 25 for this purpose may be provided at one or both longitudinal edges of the back rest 15. I have shown a strap 25 at each edge of the back rest 15 and each strap has one end pivoted or hingedly secured by a pin or bolt 26 passing through an opening in the flange 14 of a rail 12 and having its inner portion received in an opening in the strap. Angle members 27 may be provided on the rails 12 at the hinge bolts 26 to reinforce the rails at these points. The tension straps 25 have elongate longitudinally extending slots 28 which slidably receive headed pins or bolts 29 on the back rest 15. The bolts 29 may be threaded in nuts 30 secured to blocks 31 which in turn are fixed in the edge channel members 16 of the back rest 15. When the back rest 15 is in the retracted or lowered position of Figures 3, 4 and 5, the bolts 29 are at the ends of the slots 28 which are adjacent the hinge pins 26. When the back rest 15 is raised to the upright, or substantially vertical position, the bolts 29 engage the other ends of the slots 28, as illustrated in Figure 2, and thus stop or support the back rest in this raised position.

The ditching seat further includes a head rest 35. When the back rest 15 is in its lowered, substantially horizontal position, the head rest 35 is in a horizontal position under the back rest, as illustrated in Figures 3 and 4. The head rest 35 is a rectangular member of plywood, or the like, secured to the back rest 15 by a hinge pin 36 and hinges 37 so that it may be swung upwardly and extended beyond the upper end of the back rest when the latter is raised.

Sealing strips 38, of rubber, or the like, may be cemented to the back rest 15 to close or occupy the spaces between the flanges 14 and the lowered back rest to prevent dirt from entering under the ditching seat assembly. Molding or sloping ramps 40 of wood or metal may be provided at the outer sides of the rails 12 to eliminate the abrupt corners between the seat structure and the floor 11. Similar ramps may be provided at the ends of the seat assembly if desired.

As described above, two or more of the ditching seats may be arranged in a fore and aft row. Thus, as shown in Figure 3, the character A indicates a second seat mounted on the above described rails 12. Further, two or more seats may be arranged in side-by-side relation and either aligned with one another or offset. Thus the character B in Figure 3 indicates a third seat employing one of the rails 12 for its support, it being noted that in such an arrangement only three rails 12 are necessary to carry two seats or two rows of seats.

It is believed that the use or operation of the ditching seats of this invention will be readily understood from the foregoing detailed description. The seats including their supporting rails 12 may be easily and quickly installed on the floor 11 of the airplane without requiring any appreciable reworking of the airplane. Under normal flight conditions the back rest 15 is in its horizontal or lowered position illustrated in Figures 3 and 4, where the entire seat assembly lies flat against the floor. In this condition the seat does not constitute any appreciable obstruction to movement of the personnel or equipment. In the event it becomes necessary to "ditch" the airplane, that is to effect an emergency landing at sea, the back rest 15 is raised by engaging the lifting ring 22 and the head rest 35 is brought to its upright position. The crewman or occupant then sits upon the floor 11 facing in the aft direction and rests his back and head against the back rest 15 and head rest 35 respectively. He may assume a position such as illustrated in Figure 2 and engage his safety belt 24 with the attachment rings 23. In the event the ditching or emergency landing is abrupt or rough, the ditching seat and the safety belt 24 will prevent serious injury to the occupant or crewman.

It is to be observed that the ditching seat of the invention is a simple, compact and lightweight assembly that may be readily fabricated as a kit or unit for quick installation in the airplane. The device may be instantly prepared for use and does not require any preliminary manipulation or adjustment.

Having described only a typical form of the invention I do not wish to be limited to the specific details herein set forth, but wish to reserve to myself any variations or modifications that may appear to those skilled in the art and fall within the scope of the following claims.

I claim:

1. In a ditching seat adapted to be applied to an aircraft floor the combination of: supporting rail means adapted to be secured to the floor, a back rest hinged to the rail means to be movable between a substantially horizontal position at the floor and an upright position, a head rest, hinge means securing the head rest to the under side of the back rest when said back rest is in said horizontal position at a point spaced below the upper end thereof to be extended beyond the upper end of the back rest when the back rest is in said upright position and to lie horizontally beneath the back rest when the latter is in said horizontal position, and means for sustaining the back rest in said upright position.

2. In an airplane having a floor the combination of: spaced rails adapted to be secured to the floor to extend fore and aft in the airplane, a rigid material back rest, means hinging the forward end of the back rest, relative to the direction of flight, between the rails so that the back rest is movable between a generally horizontal position at and generally parallel with the floor where it may be walked upon and an upright position extending upwardly from the floor, means connected between the back rest and rails for sustaining the back rest in said upright position against loads directed forwardly relative to the direction of flight, a head rest, and means hinging the head rest to the back rest to be disposed under the back rest when the same is in said horizontal position at the floor and to extend beyond the upper end of the back rest when the same is in said upright position, said hinge means being spaced below said upper end of the back rest so that the head rest bears forwardly against the rear side of the back rest to be sustained against forward loads thereby.

References Cited in the file of this patent

UNITED STATES PATENTS

| Number | Name | Date |
|---|---|---|
| 335,554 | Anderson | Feb. 9, 1886 |
| 1,212,675 | Pettyjohn | Jan. 16, 1917 |
| 1,378,505 | White | May 17, 1921 |
| 1,663,827 | Bunevac | Mar. 27, 1928 |
| 2,186,318 | Beck | Jan. 9, 1940 |
| 2,264,383 | Kleinberg | Dec. 2, 1941 |
| 2,324,820 | Capps | July 20, 1943 |
| 2,485,111 | Robins | Oct. 18, 1949 |
| 2,606,727 | La Vern | Aug. 12, 1952 |

OTHER REFERENCES

Aviation News Magazine, p. 41, Nov. 18, 1946.